(12) United States Patent
Weber

(10) Patent No.: US 6,336,360 B1
(45) Date of Patent: Jan. 8, 2002

(54) DEVICE FOR MEASURING THE MASS OF A MEDIUM FLOWING IN A LINE

(75) Inventor: Heribert Weber, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/228,187

(22) Filed: Jan. 11, 1999

(30) Foreign Application Priority Data

Jan. 9, 1998 (DE) .......................................... 198 00 573

(51) Int. Cl.⁷ ................................................. G01F 1/68
(52) U.S. Cl. .................... 73/204.21; 73/204.22
(58) Field of Search .......................... 73/204.21, 204.22, 73/204.23

(56) References Cited

U.S. PATENT DOCUMENTS

| | | | | |
|---|---|---|---|---|
| 4,264,961 A | * | 4/1981 | Nishimura et al. | 73/204.21 |
| 5,461,910 A | * | 10/1995 | Hodson et al. | 73/202.5 |
| 5,466,093 A | * | 11/1995 | Keller | 405/152 |
| 5,563,340 A | * | 10/1996 | Clowater et al. | 73/202.5 |
| 5,948,975 A | * | 9/1999 | Mueller et al. | 73/202.5 |

FOREIGN PATENT DOCUMENTS

| | | |
|---|---|---|
| DE | 44 28 216 A1 | 2/1995 |
| DE | 44 07 209 C2 | 10/1996 |

OTHER PUBLICATIONS

Breakthrough In Reverse Flow Detection –A New Mass Air Flow Meter Using Micro Silicon Technology, 950433, (Feb. 27 –Mar. 2, 1995).

* cited by examiner

Primary Examiner—Harshad Patel
(74) Attorney, Agent, or Firm—Ronald E. Greigg

(57) ABSTRACT

A device for measuring the mass of a medium flowing in a line, which carries an intake air quantity of an internal combustion engine. The device includes a temperature-sensitive measuring element in a flow line in which the flowing medium circulates around the measuring element. The measurement conduit has deflection elements on the inlet and outlet sides of the measurement element for deflecting the flowing medium, through the conduit. The deflection elements on the inlet and outlet sides are disposed and embodied symmetrical to the measuring element disposed at the symmetry point.

14 Claims, 2 Drawing Sheets

DEVICE FOR MEASURING THE MASS OF A MEDIUM FLOWING IN A LINE

BACKGROUND OF THE INVENTION

The invention relates to a device for measuring the mass of a medium flowing in a line, in particular the intake air mass of internal combustion engines, in which the device includes a temperature-sensitive measurement instrument that is circulated around by the flowing medium and is disposed in a measurement conduit disposed in the line, and the measurement conduit has deflection elements on the inlet and outlet sides for deflecting the flowing medium.

A device for measuring the mass of a medium flowing in a line can be inferred, for example, from DE 44 07 209 C2 as well as from the published article "Breakthrough in Reverse Flow Detection—A New Mass Air Flow Meter Using Micro Silicon Technology" by Konzelmann, Hecht, and Lemke, published in SAE TECHNICAL PAPER SERIES No. 950433, 1995. With these devices, it is problematic that the inlet side deflecting elements are embodied and disposed so that the flowing medium is deflected in the direction of the measuring element. Since in many instances, particles or also fluid droplets, e.g. oil or grease droplets, are carried along by the flowing medium, particles or fluid droplets of this kind cannot be prevented from striking the measuring element and damaging it. In particular, a membrane provided for the air mass evaluation can be destroyed. The fluid droplets carried along in the flowing medium can flow beyond the membrane region of the measuring element and can lead to the destruction of the membrane. These impurities can therefore result in the failure of the measuring element and therefore of the entire device for measuring the mass of a medium flowing in a line.

In order to minimize the danger of a failure of the measuring element, DE 44 28 216 A1 has disclosed providing a housing in a heating wire air flow instrument, which housing has a main conduit through which the air flows, a central component which is supported in the main conduit of the housing, an inlet section for the intake of a part of the air flowing through the main conduit, a bypass conduit which is connected to the intake section, and an outlet section for returning the air flowing through the bypass conduit back to the main conduit. Sensor devices are provided in the bypass conduit for measuring the air flowing in the bypass conduit. The bypass conduit contains an upstream serpentine section, with a serpentine conduit on an upstream side of the sensor device, a straight tube section, which is embodied as a straight tube and contains the sensor device, as well as a downstream conduit, which connects the straight tube section to the outlet section. The serpentine tube section makes it possible for impurities of the flowing medium, for example particles or fluid droplets, to collect in the serpentine region due to their inertial mass. In this manner, a portion of the impurities of the flowing medium are in fact kept away from the measuring element, but it is nevertheless problematic that particularly at high impurity levels, a portion of the particles, fluid droplets, and the like nevertheless travels through the serpentine region and reaches the measuring element. Furthermore, with this measuring element, it is problematic that it has a relatively complex design. Moreover, it turns out to be extremely problematic that this measuring element can only be used in a flow direction-dependent manner, i.e. the measurement of the mass of a medium flowing in a line can only take place in one direction; it is not possible for the device to be acted on in a manner that is independent of the direction.

OBJECT AND SUMMARY OF THE INVENTION

The object of the invention, therefore, is to improve a device of this generic type, which is for measuring the mass of a medium flowing in a line, in such a way that firstly, a practically complete absorption of the impurities carried along by the flowing medium is possible and that it can furthermore be used in a manner that is independent of the direction of fluid flow.

ADVANTAGES OF THE INVENTION

This object is attained according to the invention with a device of the type described at the beginning that is for measuring the mass of a medium flowing in a line, in particular the intake air mass of internal combustion engines, by virtue of the fact that the inlet side and outlet side deflection elements are disposed and embodied as essentially symmetrical to the measuring element disposed at the symmetry point.

The inlet side and outlet side deflection elements that are disposed and embodied as essentially symmetrical with regard to the measuring element result in a symmetrical measurement conduit, which offers the great advantage that measurements can be carried out in two flow directions with the same sensitivity, which is of great advantage for example with regard to the appearance of pulsations occurring in the intake conduit of an internal combustion engine and the detection of these pulsations.

It goes without saying that these advantages can also be executed if the measuring element is not disposed precisely at the symmetry point, but slightly asymmetrically with regard to this symmetry point.

In order to produce a particularly favorable absorption of particles, impurities, and the like carried along in the flowing fluid, in a very advantageous embodiment, the provision is made that at least one particle-absorbing element is disposed on the surface of the wall defining the flow conduit and/or on the surface of the deflection elements, preferably on the wall regions of the flow conduit and/or of the deflection elements, which wall regions deflect the flowing medium.

In a particularly advantageous manner, the disposition of this at least one particle-absorbing element on the deflecting wall regions permits a practically complete absorption of particles, oil droplets, or grease droplets, since due to their inertial mass, these not only collide with the wall elements, but are also absorbed by the particle-absorbing element disposed there.

Purely in principle, a wide variety of embodiments is conceivable with regard to the embodiment of the at least one particle-absorbing element. An exemplary embodiment that is advantageous because it is particularly easy to produce makes the provision that the at least one particle-absorbing element is a particle-absorbing wall coating. In particular in addition to a simple manufacture, this has the particularly great advantage that the particle-absorbing element has a large surface area.

Preferably, the particle-absorbing wall coating is comprised of a gel or an adhesive layer.

A wide variety of embodiments is possible with regard to the embodiment of the deflection elements.

A particularly advantageous embodiment makes the provision that the deflection elements are embodied so that they produce a deflection of the flowing medium by at least 180°. This permits practically the complete absorption of particles and the like, particularly in connection with the particle-absorbing coating disposed in the deflection regions.

A wide variety of embodiments is conceivable with regard to the symmetrical disposition and embodiment of the deflection elements. An embodiment that is optimal in terms of flow dynamics and is advantageous in particular because it is also easy to produce makes the provision that the deflection elements are embodied so that they constitute an S-shaped flow conduit. The deflection elements are preferably bent into a cylinder shape.

This permits a very large surface area of the particle-absorbing coating, which is disposed in the deflection regions.

In order to produce an optimal flow on the measuring element, for example a turbulent flow of the medium, an advantageous embodiment makes the provision that flow elements are disposed in the flow conduit, which influence the flow dynamics of the flowing medium.

For example, the flow elements can be disposed in the flow conduit in such a way that turbulent flows are produced at the measuring element.

Purely in principle, the embodiment of the flow elements to generate a turbulent flow in the flow conduit can take place in a wide variety of ways.

An advantageous embodiment makes the provision that the flow elements are grating elements disposed in front of the measuring element.

Another advantageous embodiment makes the provision that the flow elements are structures, preferably roughened sections, that are embodied on the surface of the flow conduit, preferably on the surface of the wall elements, and they likewise generate turbulent flows in the region of the measuring element.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
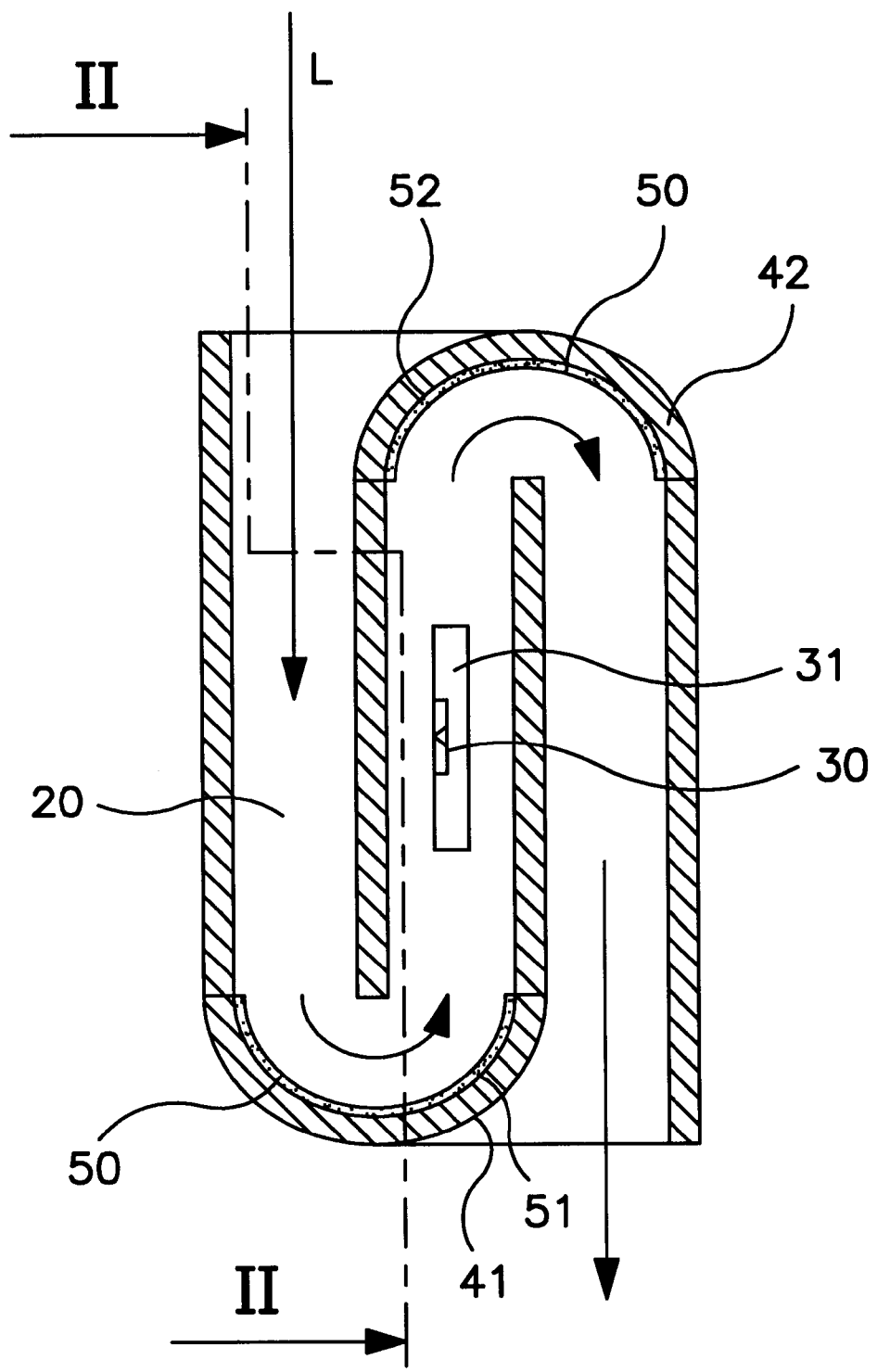
FIG. 1 is a sectional depiction, cut along the line I—I in FIG. 2, of a measurement conduit of a device for measuring the mass of a medium flowing in a line, which makes use of the invention.
Figure 2:
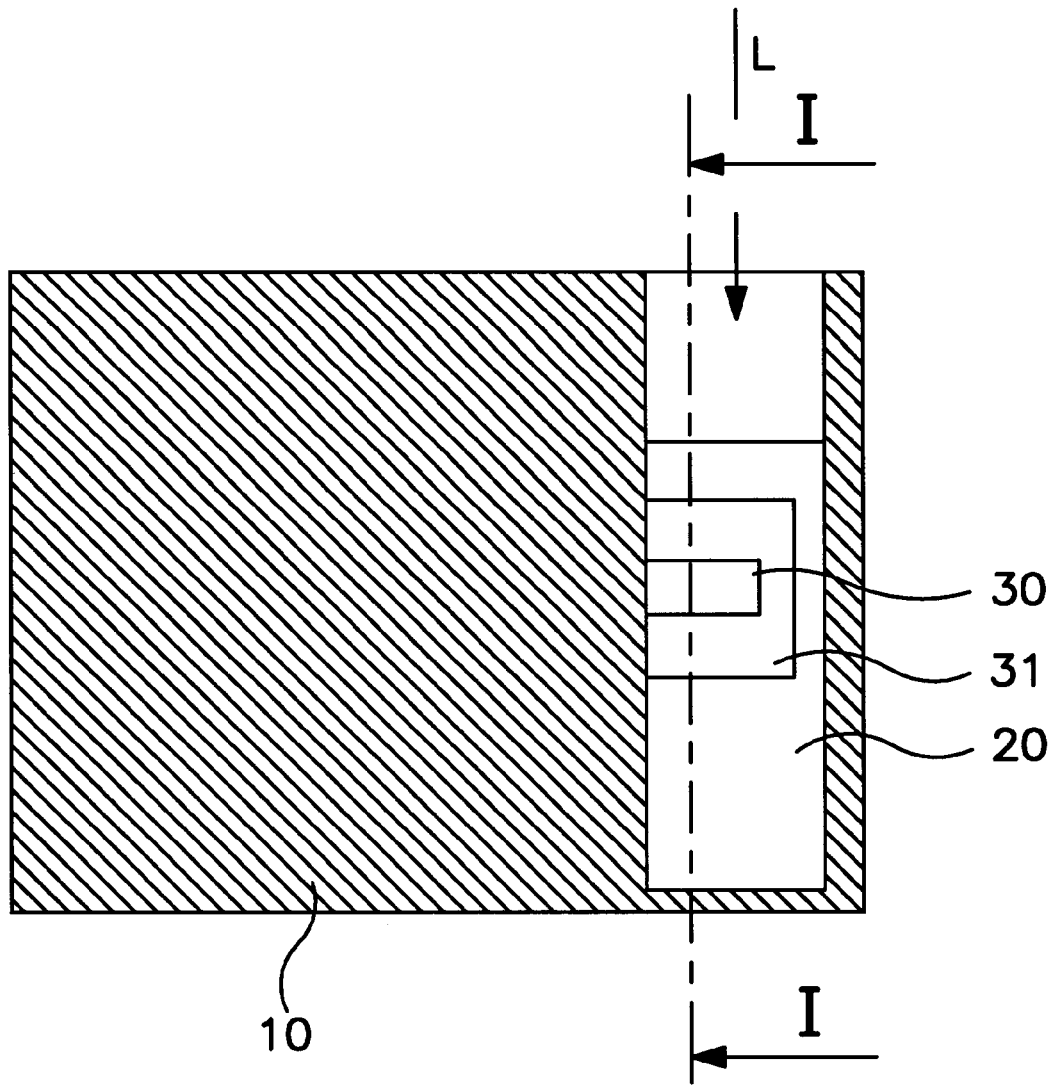
FIG. 2 is a sectional depiction, cut along the line II—II in FIG. 1, of the device that is represented in FIG. 1 and is for measuring the mass of a medium flowing in a line.

An exemplary embodiment of a device for measuring the mass of a medium flowing in a line, which is used to determine the intake air mass of an internal combustion engine and is depicted in FIGS. 1 and 2, includes a housing 10 with a measurement conduit 20, in which a measuring element 30 is disposed, which is attached to a mounting plate 31. The air flow is respectively indicated in FIGS. 1 and 2 with arrows L.

As can be inferred in particular from FIG. 1, deflection elements 41, 42 are provided in the conduit 20, which are embodied and disposed so that the air flow L is essentially deflected in an S-shape.

The measuring element 30 is disposed at the symmetry point of the measurement conduit, i.e. symmetrical to both the inlet region and the outlet region. This S-shaped flow conduit 20 embodied in the housing 10, with a symmetrically disposed measuring element 30, makes it possible for a measurement of the mass of the flowing medium to be carried out in both directions, i.e. both when the device is acted on in the direction shown in FIG. 1, from the inlet direction to the outlet direction, as well as in the reverse direction.

The measurement can take place with the same sensitivity in both directions, which is of particular advantage with regard to the appearance of pulsations, which can occur in internal combustion engines and is described, for example, in DE 44 07 209 C2, which is referred to in this case.

Through the variation of the flow regions, i.e. through the variation of the S-shaped regions with regard to their lengths and cross sections, and also through the insertion of flow elements into the measurement flow conduit 20 immediately in front of the measuring element 30, for example by means of grating elements disposed in front of the measuring element or by means of roughened sections, indicated schematically as 51, 52, on the surface of the deflection elements 41, 42, turbulent air flows that are advantageous for the measurement can be generated in the measurement region. In particular, the flow dynamics can be optimized by means of this in order to increase sensitivity and in order to yield advantageous initial characteristic curves.

As shown in FIG. 1, particle-absorbing elements in the form of particle-absorbing coatings 50 are disposed on the deflection elements 41, 42 on the inside of the flow conduit. In a particularly advantageous manner, these absorb particles and fluid droplets, e.g. oil or grease droplets, which are carried along by the flowing medium. The S-shaped embodiment of the flow conduit turns out to be particularly advantageous. However, it goes without saying that the device is not limited to this kind of "S-shaped" embodiment, but that other deflection elements can be used that deflect the air flow and are coated with particle-absorbing coatings 50. In any case, a deflection by at least 180° is particularly advantageous since in this manner, the impurities, particles, and the like that are carried along by the flowing medium, due to their inertial mass, move toward the particle-absorbing coatings 50 that are disposed in the deflection regions on the deflection elements 41, 42, collide with the coatings 50, and are absorbed by them.

Naturally these advantages can also be achieved when the measuring element is not disposed precisely at the symmetry point, but is disposed slightly asymmetrically with regard to the symmetry point.

The particle-absorbing coatings can for example be produced by means of coating with a gel or by means of gluing on a double-sided adhesive band. Furthermore, a particle-absorbing coating can also be produced by roughening the wall surface. In all of these instances, particles carried along by the air flow, which strike the particle-absorbing coating, are absorbed by it and are thus prevented from flowing further in the air flow.

The foregoing relates to preferred exemplary embodiments of the invention, it being understood that other variants and embodiments thereof are possible within the spirit and scope of the invention, the latter being defined by the appended claims.

I claim:

1. A device for measuring the mass of a medium flowing in a line, the device comprising:
   a measurement conduit (20) positioned in the intake line so as to admit a portion of the fluid flowing through the intake line,
   a temperature-sensitive measuring element (30) disposed in the measurement conduit and about which the portion of the flowing fluid circulates, the measurement conduit including a first end and a second end, a first deflection element (41) positioned near the first end, and a second deflection element (42) positioned near the second end, said deflection elements deflecting the portion of the flowing fluid, the deflection elements (41, 42) being positioned essentially symmetrically with respect to the measuring element (30), such that the portion of the flowing fluid traverses a substantially symmetrical path through the measuring conduit, whether it traverses a path from the first end to the second end, or from the second end to the first end, and at least one particle-absorbing element (50) disposed on a surface of a wall defining said measurement conduit in the region of the wall which deflects the flowing fluid.

2. A device according to claim 1, in which the at least one particle-absorbing element is a particle-absorbing coating (50).

3. A device according to claim 1, in which the particle-absorbing coating (50) is comprised of a gel or an adhesive layer.

4. A device according to claim 1, in which the first and second flow deflection elements (41, 42) are embodied so that they produce a deflection of the flowing medium by at least 180°.

5. A device according to claim 1, in which the first and second flow deflection elements (41, 42) are embodied so that they constitute an S-shaped flow conduit (20).

6. A device for measuring the mass of a medium flowing in a line, the device comprising:

a measurement conduit (20) positioned in the intake line so as to admit a portion of the fluid flowing through the intake line, a temperature-sensitive measuring element (30) disposed in the measurement conduit and about which the portion of the flowing fluid circulates, the measurement conduit including a first end and a second end, a first flow deflection element (41), positioned near the first end, and a second flow deflection element (42) positioned near the second end, said first and second flow deflection elements (41, 42) being positioned essentially symmetrically with respect to the measuring element (30), such that the portion of the flowing fluid traverses a substantially symmetrical path through the measuring conduit, whether it traverses a path from the first end to the second end, or from the second end to the first end, said first and second flow deflection elements (41, 42) being embodied and positioned so as to produce a deflection of the flowing fluid of at least 180°.

7. A device according to claim 6, in which at least one particle-absorbing element is disposed on a surface of at least one deflection element which deflects the flowing medium.

8. A device according to claim 6, in which the at least one particle-absorbing element is a particle-absorbing coating (50).

9. A device according to claim 6, in which the particle-absorbing coating (50) is comprised of a gel or an adhesive layer.

10. A device according to claim 6, in which the first and second flow deflection elements (41, 42) are embodied so that they constitute an S-shaped flow conduit (20).

11. A device for measuring the mass of a medium flowing in a line, the device comprising:

a measurement conduit (20) positioned in the intake line so as to admit a portion of the fluid flowing through the intake line;

a temperature-sensitive measuring element (30) disposed in the measurement conduit and about which the portion of the flowing fluid circulates, the measurement conduit including a first end and a second end, a first deflection element (41) positioned near the first end, and a second deflection element (42) positioned near the second end, said first and second deflection elements (41, 42) deflecting the portion of the flowing fluid, the first and second deflection elements (41, 42) being positioned essentially symmetrically with respect to the measuring element (30), such that the portion of the flowing fluid traverses a substantially symmetrical path through the measuring conduit, whether it traverses a path from the first end to the second end, or from the second end to the first end, said first and second flow deflection elements (41, 42) having means (51, 52) to influence the flow dynamics of the flowing fluid.

12. A device according to claim 11, in which the means to influence the flow dynamics (51, 52) are disposed in the flow conduit in such a way that turbulent flows are produced at the measuring element (30).

13. A device according to claim 11, in which the means to influence the flow dynamics (51, 52) are roughened structures, embodied on the surface of the flow conduit.

14. A device according to claim 11, in which the means to influence the flow dynamics (51, 52) are roughened structures, embodied on the surface of the deflection elements.

* * * * *